(12) United States Patent
Seok et al.

(10) Patent No.: US 11,294,520 B2
(45) Date of Patent: Apr. 5, 2022

(54) TOUCH INPUT DEVICE AND MANUFACTURING METHOD THEREOF

(71) Applicants: HYUNDAI MOTOR COMPANY, Seoul (KR); KIA MOTORS CORPORATION, Seoul (KR)

(72) Inventors: Donghee Seok, Seoul (KR); Gideok Kwon, Seoul (KR); Jong Bok Lee, Suwon-si (KR); HeeJin Ro, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 58 days.

(21) Appl. No.: 16/849,687

(22) Filed: Apr. 15, 2020

(65) Prior Publication Data

US 2020/0241668 A1    Jul. 30, 2020

Related U.S. Application Data

(62) Division of application No. 15/373,167, filed on Dec. 8, 2016, now Pat. No. 10,664,107.

(30) Foreign Application Priority Data

Sep. 23, 2016    (KR) .................. 10-2016-0121923

(51) Int. Cl.
    *G06F 3/044*    (2006.01)
(52) U.S. Cl.
    CPC .......... *G06F 3/0445* (2019.05); *G06F 3/0446* (2019.05); *G06F 2203/04101* (2013.01); *G06F 2203/04103* (2013.01); *G06F 2203/04111* (2013.01); *G06F 2203/04112* (2013.01)

(58) Field of Classification Search
    CPC ................ G06F 3/0445; G06F 3/0446; G06F 2203/04101; G06F 2203/04103; G06F 2203/04111; G06F 2203/04112
    See application file for complete search history.

(56) References Cited

U.S. PATENT DOCUMENTS

| | | | |
|---|---|---|---|
| 2012/0113063 A1* | 5/2012 | Kim | ...................... G06F 3/0443 345/176 |
| 2013/0266724 A1 | 10/2013 | Cheong | |
| 2013/0277091 A1 | 10/2013 | Chang | |
| 2013/0321004 A1 | 12/2013 | Chen | |

(Continued)

FOREIGN PATENT DOCUMENTS

| | | |
|---|---|---|
| CN | 101625614 A | 1/2010 |
| CN | 103208326 A | 7/2013 |

(Continued)

OTHER PUBLICATIONS

U.S. Non-Final Office Action dated Mar. 28, 2019 issued in U.S. Appl. No. 15/373,167.

(Continued)

*Primary Examiner* — Deeprose Subedi
(74) *Attorney, Agent, or Firm* — Morgan, Lewis & Bockius LLP

(57) ABSTRACT

A touch input device comprises a body having a plurality of hole portions; and a signal transfer unit formed in the body, wherein the signal transfer unit is provided to pass on the body between the hole portions adjacent thereto to recognize a user's touch signal.

7 Claims, 19 Drawing Sheets

(56) References Cited

U.S. PATENT DOCUMENTS

| | | |
|---|---|---|
| 2015/0160691 A1 | 6/2015 | Kadah |
| 2016/0327300 A1 | 11/2016 | Ribbich |
| 2017/0006374 A1 | 1/2017 | Song |

FOREIGN PATENT DOCUMENTS

| | | |
|---|---|---|
| CN | 103336593 A | 10/2013 |
| CN | 104347155 A | 2/2015 |
| CN | 104636016 A | 5/2015 |
| JP | 2002-532620 A | 10/2002 |
| JP | 2014-186403 A | 10/2014 |
| KR | 2001-0040872 A | 5/2001 |
| KR | 10-2008-0110477 A | 12/2008 |
| KR | 10-2012-0107248 A | 10/2012 |
| KR | 10-1513673 B1 | 4/2015 |
| KR | 10-2015-0094539 A | 8/2015 |
| TW | 201344871 A | 11/2013 |

OTHER PUBLICATIONS

U.S. Final Office Action dated Jul. 12, 2019 issued in U.S. Appl. No. 15/373,167.

U.S. Notice of Allowance dated Feb. 7, 2020 issued in U.S. Appl. No. 15/373,167.

U.S. Non-Final Office Action dated Oct. 24, 2019 issued in U.S. Appl. No. 15/373,167.

Chinese Office Action dated Jan. 6, 2021 issued in Chinese Patent Application No. 201611160922.4 (with English translation).

J. Lee, et al., An Analysis of Electrode Patterns in Capacitive Touch Screen Panels, Journal of Display Technology, vol. 10, No. 5, May 2014.

M. Lienhard, et al., "Affordable and reliable technology for liquid crystal displays," Technical Forum, EDN China, Oct. 2012 (with English translation).

* cited by examiner

TOUCH INPUT DEVICE AND MANUFACTURING METHOD THEREOF

CROSS-REFERENCE TO RELATED APPLICATION(S)

This application is a divisional patent application of U.S. patent application Ser. No. 15/373,167, filed on Dec. 8, 2016, which claims the benefit of priority to Korean Patent Application No. 10-2016-0121923, filed on Sep. 23, 2016 in the Korean Intellectual Property Office, the disclosures of which are incorporated herein by reference.

TECHNICAL FIELD

The present disclosure relates to a touch input device and a manufacturing method thereof, more particularly, to a touch input device having a porous surface and a manufacturing method thereof.

BACKGROUND

A technology to implement a touch input device capable of performing a touch operation may include a resistive method, a capacitive method, a surface acoustic wave method, and a transmitter method.

A touch input device using the capacitive method includes electrode patterns extending in directions intersecting with each other to detect a change in the capacitance between the electrode patterns touched by an input means, e.g. a human finger, in order to identify an input position. Another type of the touch input device using the capacitive method identifies an input position in such a manner that an in-phase, equi-potential current is applied between both ends of a transparent conductive film and a weak current, which is generated by the formation of a capacitor due to the approach or touch of an input means, e.g, a human finger, to the transparent conductive film, is detected.

In general, a touch input device may be configured by a two-panel laminated structure in which a first panel adheres to a second panel by using an adhesive. The first panel may include first detection patterns arranged in the first direction (i.e. X axis direction) on a first substrate and a plurality of first metal patterns connecting sensor circuits to calculate a position of the detection patterns, and the second panel may include second detection patterns arranged in the second direction (i.e. Y axis direction) on a second substrate and a plurality of second metal patterns connecting sensor circuits to calculate a position of the detection patterns.

Further, a capacitive touch panel having a structure of two layers in a single sheet has been disclosed.

A manufacturing method of a touch input device employs a method using a transparent electrode, i.e. indium tin oxide (ITO), a method using a metal mesh, and a method using flexible printed circuit board (FPCB).

The above mentioned processes require multiple process steps, and thus, the processes may be complicated and also the cost of the processes may be relatively expensive. Particularly, the manufacturing process using ITO may have a difficulty in the price of the product due to using high price material, e.g. rare earth materials.

In addition, the conventional processes are performed by using an adhesion method, and thus, the product may be vulnerable to an external vibration and impact, and a high temperature. Therefore, the durability of the product may be reduced and it may be difficult to apply the product to a device associated with the vibration and the high temperature.

SUMMARY

An aspect of the present disclosure provides a touch input device having a touch sensor provided on a porous surface through which a medium is passed, and a manufacturing method thereof.

Another aspect of the present disclosure provides a touch input device capable of forming an electrode thereof without using an adhesion method and a manufacturing method thereof.

Additional aspects of the present disclosure will be set forth in part in the description which follows and, in part, will be obvious from the description, or may be learned by practice of the present disclosure.

In accordance with embodiments of the present disclosure, a touch input device comprising: a body unit provided with a plurality of hole portions; and a signal transfer unit formed in the body unit, wherein the signal transfer unit is provided to pass on the body unit between the hole portions adjacent thereto to recognize a user's touch signal.

The plurality of hole portions are provided to allow a medium to pass therethrough.

The body unit is provided in a mesh type in which the plurality of hole portions are formed, wherein a region of the body unit in which the signal transfer unit is formed acts as a touch unit configured to receive an input a user's touch signal.

The body unit comprises a base including a metal complex and a pattern groove formed on one surface of the base, wherein the signal transfer unit is a detection pattern provided in the pattern groove.

The base comprises a first base and a second base laminated on the first base, the pattern groove comprises a first pattern groove formed on one surface of the first base and a second pattern groove formed on one surface of the second base, and the detection pattern comprises a first detection pattern provided on the first pattern groove and a second detection pattern provided on the second pattern groove.

The first pattern groove perpendicularly intersects the second pattern groove with respect to the second base.

The base comprises a resin comprising any one or more of Polycarbonate (PC), Polyamide (PA), and acrylonitrile-butadiene-styrene copolymer (ABS), and a metal oxide comprising any one or more of Mg, Cr, Cu, Ba, Fe, Ti, and Al.

The base is coated on one surface of one of resin, glass or leather.

The pattern groove comprises a first pattern groove formed on one surface of the base and a second pattern groove formed on a rear surface of the base, and the detection pattern comprises a first detection pattern provided on the first pattern groove and a second detection pattern provided on the second pattern groove.

The pattern groove comprises a first pattern groove and a second pattern groove formed on one surface of the base, and the detection pattern comprises a first detection pattern provided on the first pattern groove and a second detection pattern provided on the second pattern groove, wherein the first detection pattern and the second detection pattern are apart from each other.

The touch input device is any one of an air conditioning, a heater and an air cleaner that is configured to allow air to be passed via the plurality of hole portions.

The touch input device is a speaker configured to output sound via the plurality of hole portions.

A region of the body unit in which the plurality of hole portions are formed comprises a concave surface or a convex surface.

A width of the detection pattern is equal to or more than 25 μm and a distance between the detection patterns adjacent to each other is equal to or more than 30 μm.

In accordance with another embodiment of the present disclosure, a manufacturing method of a touch input device comprising: preparing a base including a metal complex on a body unit in which a plurality of hole portions are formed; forming a pattern groove to pass between the hole portions adjacent thereto by irradiating laser beams to one surface of the base; forming a detection pattern by a plating process or a deposition process on the pattern groove; and determining whether the detection pattern can be used as a sensor or not by detecting a change in capacitance by providing a current to the detection pattern.

The preparing of the base comprises preparing a first base and a second base laminated on the first base, the forming of the pattern comprises forming a first pattern groove by irradiating laser beams to one surface of the first base and forming a second pattern groove by irradiating laser beams to one surface of the second base, and the forming of the detection pattern comprises plating or depositing the first pattern groove with a first detection pattern and plating or depositing the second pattern groove with a second detection pattern.

The forming of the pattern groove comprises forming a first pattern groove by irradiating laser beams to one surface of the base and forming a second pattern groove by irradiating laser beams to a rear surface of the base, and the forming of the detection pattern comprises plating or depositing the first pattern groove with a first detection pattern and plating or depositing the second pattern groove with a second detection pattern.

The forming of the pattern groove comprises forming a first pattern groove and a second pattern groove by irradiating laser beams to one surface of the base, and the forming of the detection pattern comprises plating or depositing the first pattern groove with a first detection pattern and plating or depositing the second pattern groove with a second detection pattern apart from the first detection pattern.

Modeling a shape of the body unit including the plurality of hole portions; modeling the detection pattern such that the detection pattern passes between the hole portions adjacent thereto; and detailed designing the detection pattern in consideration with a width and a thickness of the detection pattern and the number of lines of the detection pattern.

A three dimensional (3D) modeling of the body unit is performed, wherein the body unit comprises a curved surface, including a concave surface or a convex surface, in which the plurality of hole portions are formed, and a 3D modeling of the detection pattern is performed such that the detection pattern passes between the hole portions adjacent thereto.

A 3D modeling of a mesh region of the body unit including the plurality of hole portions is performed and the 3D modeling of the detection pattern is performed according to a shape of the mesh region, wherein the modeling the detection pattern comprises modeling a thickness of the detection pattern according to a distance between the plurality of hole portions, and modeling the number of lines of the detection pattern according to an area of the mesh region and a required touch resolution.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

The present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

The touch input device is a device configured to receive a signal by a touch (or a proximity) of an input means e.g., a user's finger or a touch pen to identify a position of a touch (or a proximity).

A structure of the touch input device 100 will be described with reference to FIG. 1.

Figure 1:
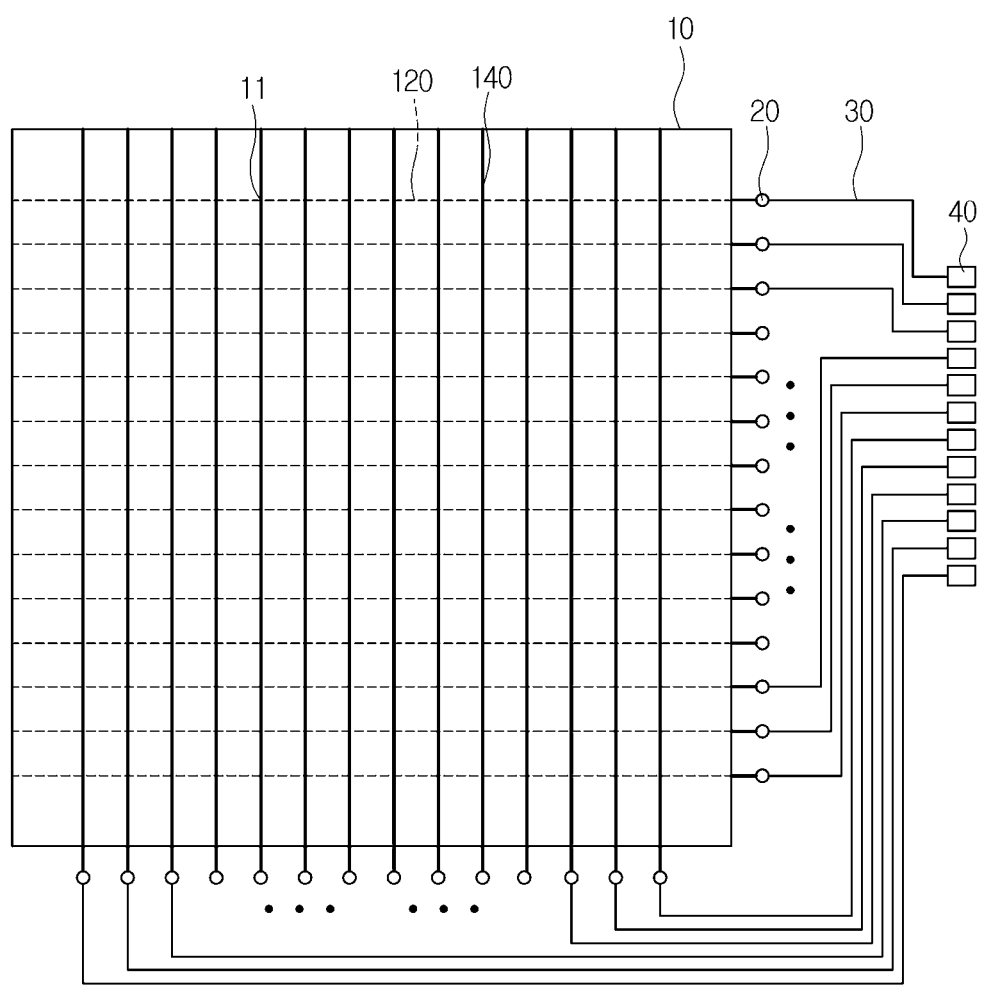
FIG. 1 is a view illustrating an arrangement of electrodes of the touch input device in accordance with one embodiment.

FIG. 1 is a view illustrating an arrangement of electrodes of the touch input device 100 in accordance with one embodiment. Particularly, although FIG. 1 is different from an actual appearance, FIG. 1 is a plane view to easily describe an operation method of the touch input device 100. The touch input device 100 may include a touch unit 10 capable of making contact with an input means of a user (e.g. a finger or a touch pen), a first and second detection pattern 120 and 140 integrally formed with the touch unit 10 or provided in a lower side of the touch unit 10, and a wiring unit 30 and a connection pad 40 connected to the first and second detection pattern 120 and 140.

The first detection pattern 120 and the second detection pattern 140 may be formed in a certain pattern to detect a position of the finger or the touch pen of the user by detecting the change in the capacitance when the user comes in contact with the touch input device 100 with the finger or the touch pen. The contact (touch) may be defined to include a direct contact and an indirect contact. That is, the direct contact may represent a case in which an object comes in contact with the touch input device 100 and the indirect contact may represent a case in which an object approaches a range in which the detection pattern is able to detect the object, without making contact with the touch input device 100.

The first detection pattern 120 may be arranged to divide a certain section in a first direction (a horizontal direction in the drawings), and the second detection pattern 140 may be arranged to divide a certain section in another direction different from the first direction (a vertical direction in the drawings). The first detection pattern 120 and the second detection pattern 140 may be disposed in a different layer, and form a cross-section part 11. In the cross-section part 11, the first detection pattern 120 and the second detection pattern 140 may be overlapped with respect to an insulation part without making contact with each other.

The cross-section part 11 may determine the resolution of the touch unit 10 and the cross-section part 11 may be recognized as a coordinate. That is, the cross-section part 11 may distinguish a case in which the input means comes in contact with any one of the cross-section part 11, from a case in which the input means comes in contact with another cross-section part 11 adjacent to the cross-section part 11, and detect that the input means comes in contact with which position of the cross-section part 11. Therefore, in terms of the same area, as the number of the cross-section part 11 is increased, the resolution of the touch unit 10 may be increased.

One end of the first and second detection pattern 120 and 140 may be connected to the wiring unit 30 formed by a metal wiring. The connection pad 40 may be disposed on one end of the wiring unit 30, and the wiring unit 30 may be connected to a circuit board (not shown) via the connection pad 40.

Further, a connection unit 20 may be provided on one end portion of the first and second detection pattern 120 and 140. Since the connection unit 20 is provided to be wider than a width of the first and second detection pattern 120 and 140, the wiring unit 30 may be electrically connected to the connection unit 20. The connection unit 20 and the wiring unit 30 may be adhered by a conductive adhesive (e.g. solder).

The wiring unit 30 may transmit a detection signal of the detection pattern to the circuit board via the connection pad 40. The wiring unit 30 and the connection pad 40 may be formed of a conductive material.

The circuit board may act as a controller. The controller may determine that the input means is connected to which position by receiving information related to capacitance via the wiring unit 30. Further, the controller may provide an alarm or perform a function by analyzing touch information of the input means.

Particularly, when the received information related to capacitance is placed within a predetermined first capacitance range, the controller may determine that the input means comes in contact with the touch unit 10. Further, when the received information related to capacitance is placed within a predetermined second capacitance range, the controller may determine that the input means is placed in a proximity range of the touch unit 10.

For example, when the input means is in contact with one region of the touch unit 10, the capacitance of the cross-section part 11 may be reduced and then via the wiring unit 30 and the connection pad 40, information related to the capacitance may be transmitted to the circuit board acting as the controller. Accordingly, the controller may perform a function by determining that the input means is in contact with which position.

Further, when the input means is closed to one region of the touch unit 10, the capacitance of the cross-section part 11 may be also reduced and the controller may provide an alarm by determining that the input means is closed to which position.

Figure 2:
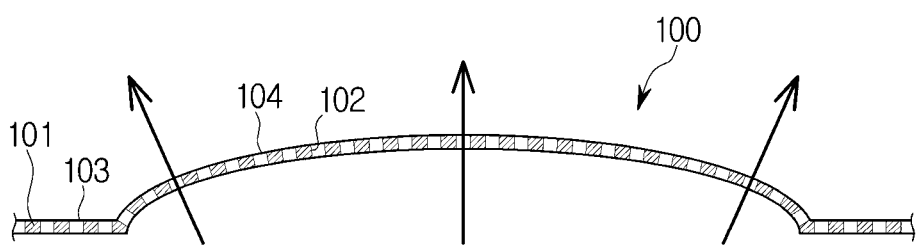
FIG. 2 is a cross-sectional view illustrating the touch input device in accordance with a first embodiment of the present disclosure.
Figure 3:
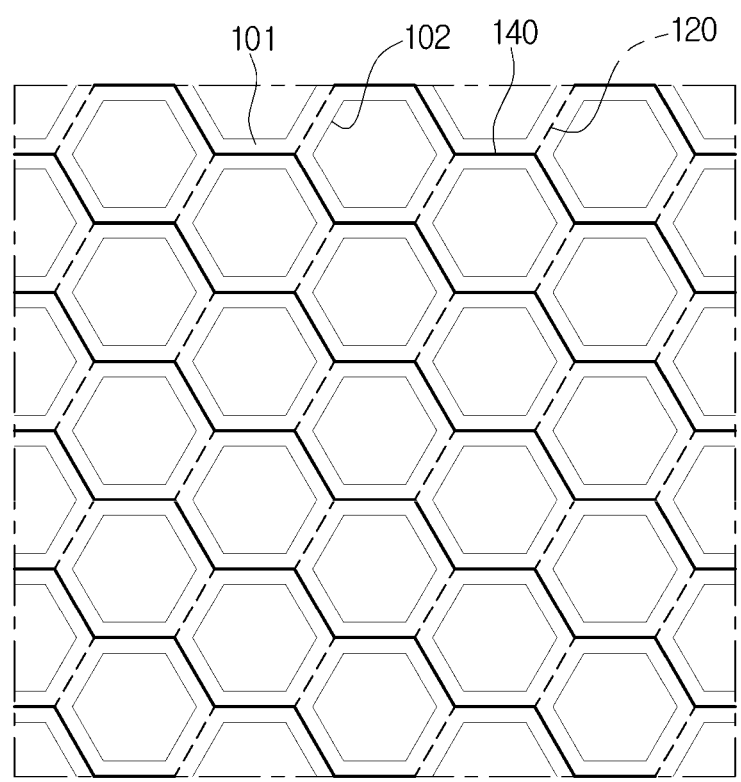
FIG. 3 is a plane view illustrating a porous surface of the touch input device in accordance with the first embodiment of the present disclosure.

FIG. 2 is a cross-sectional view illustrating the touch input device 100 in accordance with a first embodiment of the present disclosure. FIG. 3 is a plane view illustrating a porous surface of the touch input device 100 in accordance with the first embodiment of the present disclosure.

According to the first embodiment of the present disclosure, the touch input device 100 may include a body unit 101 and a plurality of hole portions 102 formed in the body unit 101. Accordingly, the touch input device 100 may include a porous surface.

The hole portion 102 of the touch input device 100 may have a passage shape so that a medium passes therethrough. The medium may be a fluid including air. For example, the touch input device 100 may be an air conditioning or a heater provided with a hole portion 102 through which cold air or heated air passes. The touch input device 100 may be an air cleaner provided with a hole portion 102 through which air passes. In addition, the touch input device 100 may be a speaker provided with a hole portion 102 through which air having a wavelength passes. The touch input device 100 may be a dish washer having a hole portion 102 through which water passes. Further, the touch input device 100 may be a variety of devices through which a fluid passes by a hole portion 102.

A signal transfer unit may be formed on the body unit 101. The signal transfer unit may be formed of a conductive material, e.g. a metal.

The signal transfer unit may correspond to a detection pattern configured to allow capacitance to be changed by proximity or contact of an input means. The signal transfer unit may include the first and the second detection pattern 120 and 140. In this case, the controller may recognize a touch signal by detecting the change in mutual capacitance between the first detection pattern 120 and the second detection pattern 140. Alternatively, the controller may recognize a touch signal by detecting the change in self capacitance between the input means and the detection pattern.

The body unit 101 may include a curved surface or an inclined surface. For example, the body unit 101 may include a concave surface or a convex surface, or an inclined surface.

The body unit 101 may include a mesh type or a net type in which the plurality of hole portions 102 are densely formed. The body unit 101 may be formed in a such manner entire area of the body unit 101 is in the mesh type or a part of the body unit 101 is in the mesh type.

The shape of the hole portion 102 may vary. For example, the hole portion 102 may have a variety of patterns, e.g. a polygonal shape including a circular shape, an oval shape, or a rectangular shape. Alternatively, the hole portion 102 may have an irregular pattern.

A user may input a touch signal by making contact with the body unit 101 of the touch input device 100. That is, the body unit 101 may act as a touch unit configured to recognize a touch signal of the user. Particularly, the signal transfer unit may be provided in the body unit 101 between the hole portion 102 adjacent thereto, and capacitance thereof may be changed by the proximity or the contact of an input means.

Hereinafter an embodiment including the first and second detection pattern 120 and 140 in which the signal transfer unit is disposed on a different layer will be described.

Figure 4:
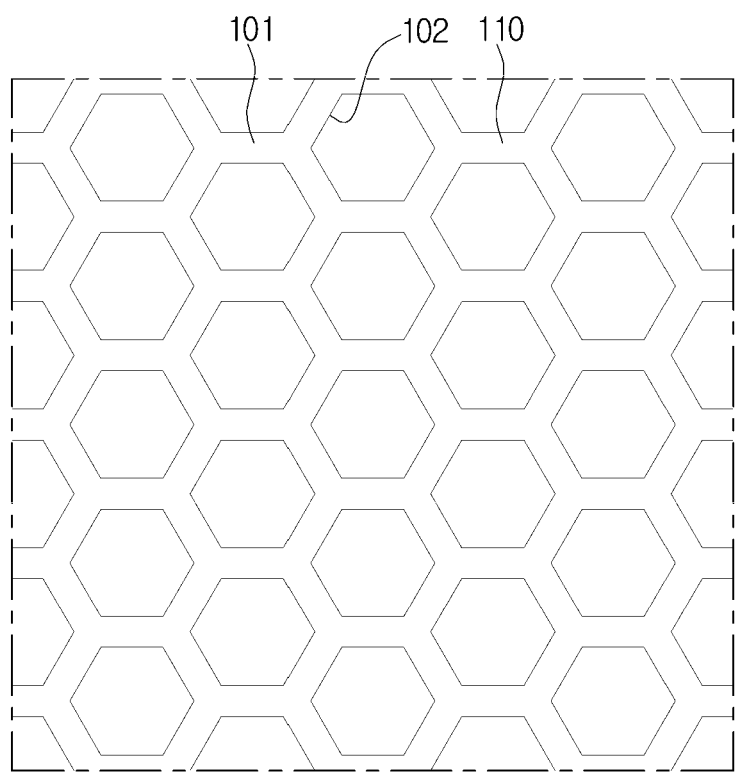
FIG. 4 is a view illustrating a process of preparing a first base.
Figure 5:
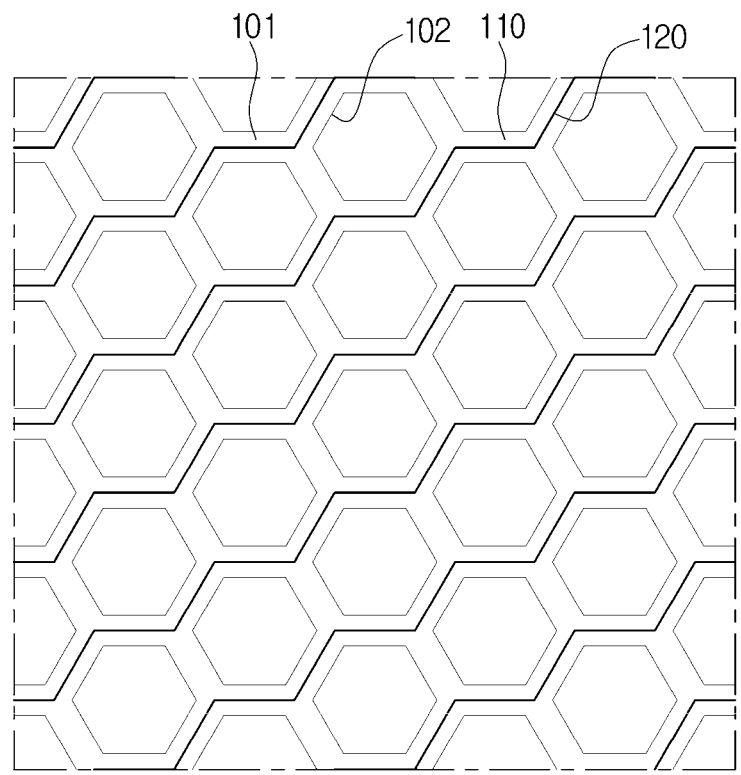
FIG. 5 is a view illustrating a process of forming the first detection pattern on the first base.
Figure 6:
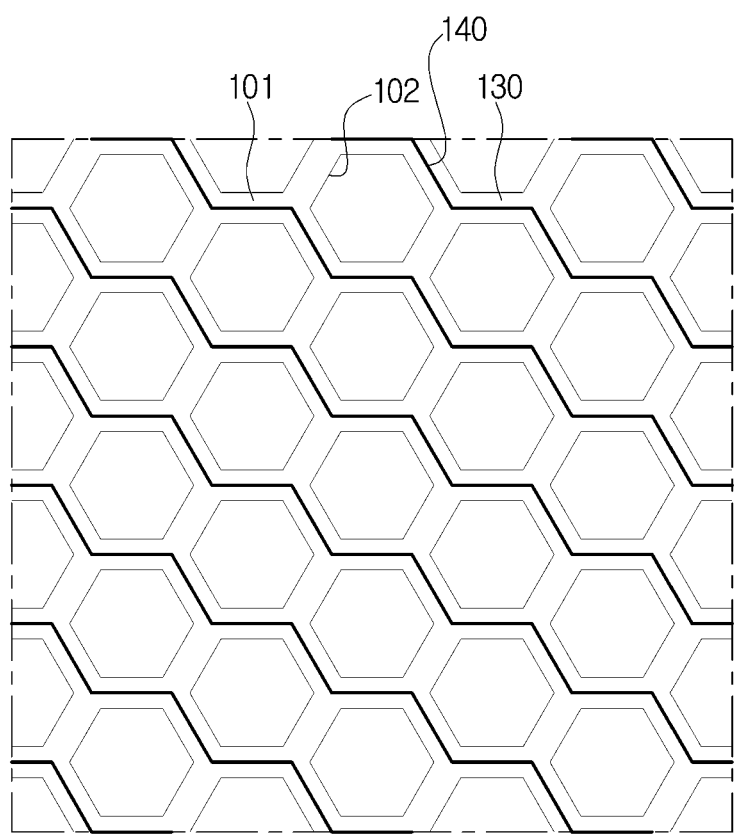
FIG. 6 is a view illustrating a process of forming the second detection pattern on a second base.

FIGS. 4 to 6 are views illustrating a process of forming a detection pattern, and particularly, FIG. 4 is a view illustrating a process of preparing a first base 110, FIG. 5 is a view illustrating a process of forming the first detection pattern 120 on the first base 110, and FIG. 6 is a view illustrating a process of forming the second detection pattern 140 on a second base 130.

Referring to FIG. 4, the plurality of hole portions 102 may be provided in the body unit 101. In this time, the body unit 101 may be injection molded after the plurality of hole portions 102 are formed. Alternatively, after the body unit 101 is injection molded, the plurality of hole portions 102 may be formed.

The first base 110 may be integrally formed with the body unit 101 or the first base 110 may be formed to be laminated on one surface of the body unit 101. When the first base 110 is formed to be laminated on one surface of the body unit 101, the first base 110 may be coated on one surface of the body unit 101 or coated on only a region of the body unit 101 excluding a region in which the hole portion 102 is provided.

FIG. 4 illustrates that the shape of the hole portion 102 is a hexagon and one surface of the hole portions 102 adjacent thereto are arranged in parallel with each other.

Referring to FIG. 5, the first detection pattern 120 may be formed on the first base 110. The first detection pattern 120 may pass between the hole portions 102 adjacent thereto. In addition, the first detection pattern 120 may include a plurality of lines disposed in parallel with each other with respect to the hole portion 102 arranged in parallel with each other.

Further, the first detection pattern 120 may be provided in a curved line or a bent line rather than a straight line depending on the shape of the hole portion 102. The bent line may include a crooked line.

Referring to FIG. 6, the second base 130 may be laminated on the first base 110 and then the second detection pattern 140 may be formed on the second base 130. The second detection pattern 140 may be arranged to pass between the hole portion 102 adjacent thereto. Further, the second detection pattern 140 may include a plurality of lines disposed in parallel with each other with respect to the hole portion 102 arranged in parallel with each other.

In FIG. 6, the first detection pattern 120 is illustrated as a dotted line since the first detection pattern 120 is disposed under the second base 130.

The second detection pattern 140 may be arranged to intersect with the first detection pattern 120. That is, the first detection pattern 120 may include a plurality of lines arranged in one direction, and the second detection pattern 140 may include a plurality of lines arranged in another direction perpendicular to the one direction.

Figure 7:
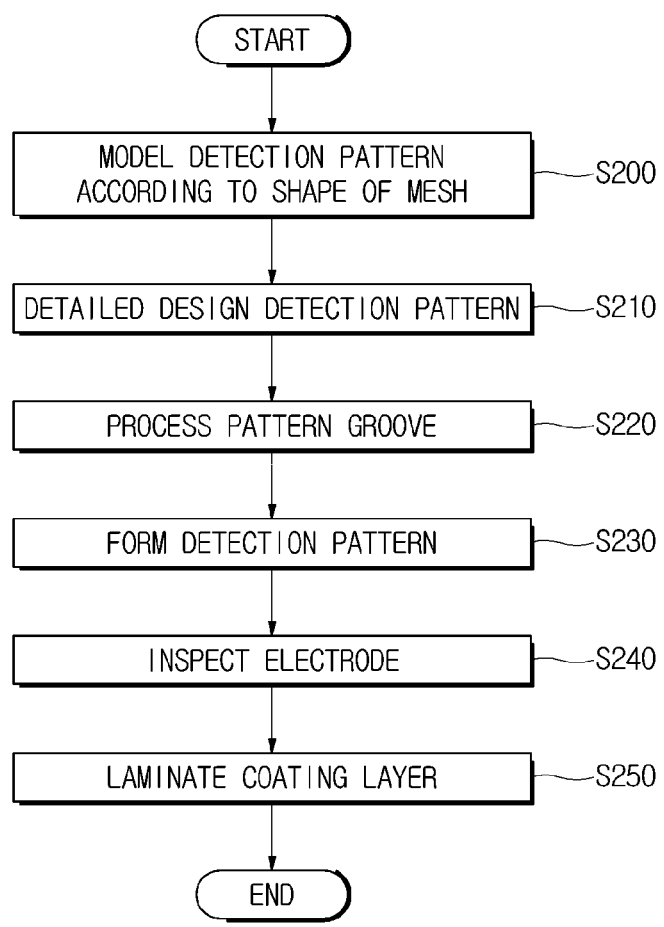
FIG. 7 is a flowchart illustrating designing the detection pattern.

FIG. 7 is a flowchart illustrating designing the detection pattern.

Although not shown in FIG. 7, the body unit 101 including the plurality of hole portions 102 may be provided. Modeling the shape of the body unit 101 may be performed. When the shape of the body unit 101 is a plane, two dimensional (2D) modeling may be proper for the modeling, but when the shape of the body unit 101 includes a curved surface, three dimensional (3D) modeling may be required.

A mesh region including the plurality of hole portions 102 may be provided in the body unit 101. The 3D modeling of the body unit 101 may include modeling the mesh region.

Modeling a detection pattern according to each shape of the mesh may be performed (200). The shape of the mesh may be determined by the shape of the plurality of hole portions 102. The modeling of the detection pattern may be provided to pass between the hole portions 102 adjacent thereto.

The modeling of the detection pattern may be provided in the first detection pattern 120 and the second detection pattern 140 which are provided in a different layer.

A detailed designing the detection pattern may be performed (210). The detailed designing the detection pattern may include a detailed designing, e.g. a width and thickness of the detection pattern, or the number of the line of the detection pattern, and a distance between the detection patterns. That is, the width of the detection pattern may be determined according to the distance between the hole portions 102 adjacent thereto, and the thickness of the detection pattern may be determined according to a thickness of the base.

For example, when the distance between the hole portion 102 adjacent thereto is large, the width of the detection pattern may be needed to be sufficiently wide so that a stable touch detection may be allowed. Otherwise, when the distance between the hole portions 102 adjacent thereto is short, the width of the detection pattern may be needed to be narrow. As mentioned above, the modeling may be performed by estimating a width of the detection pattern that is appropriate for the distance between the hole portions 102 adjacent thereto.

The distance between the detection patterns may be set according to the width of the mesh pattern and the expected performance of the touch function of the product. In general, the distance between the detection patterns may be directly proportional to the touch resolution. That is, the detection pattern may be provided on each line of the hole portion 102 of the mesh pattern, or the detection pattern may be alternately provided on the line of the hole portion 102 of the mesh pattern.

The electrode width of the detection pattern may be equal to or more than 25 μm, and the distance between the detection patterns is equal to or more than 30 μm so that a function as a touch panel may be performed.

According to the designed modeling, a pattern groove may be processed (220) and the detection pattern may be formed (230). An electrode inspection may be performed to inspect whether the detection pattern is normally operated (240), and when it is determined that the detection pattern is normally operated, manufacturing the product may be completed by laminating a coating layer (250).

Hereinafter a structure and a manufacturing method of a touch input device 100-1 in accordance with a second embodiment of the present disclosure will be described with reference to FIG. 8. Hereinafter it is assumed that the mesh pattern is omitted in the touch input device 100-1, but the above mentioned mesh pattern without change may be applied.

The touch input device 100-1 according to the second embodiment of the present disclosure may include a first base 110 including a first pattern groove 111, a first detection pattern 120 plated or deposited on the first pattern groove 111, a second base 130 laminated on the first base 110 and including a second pattern groove 131, a second detection pattern 140 plated or deposited on the second pattern groove 131, and a coating layer 150 insulating the second detection pattern 140.

The first detection pattern 120 and the second detection pattern 140 may be formed on the first base 110 and the second base 130 by using laser directing structure (LDS) method. The LDS method represents a method in which forming a support material by using a material including a metal complex that is non-conductive and chemically stable, exposing a metal seed by breaking a chemical bonding of the metal complex by exposing a part of the support material to a laser, e.g. ultra violet (UV) laser or excimer laser, and then forming a conductive structure on a laser exposed part of the support material by metalizing the support material are performed. The LDC method is disclosed in Korea Patent Registration Publication No 374667, Korea Patent Laid-Open Publication No. 2001-40872 and No. 2004-21614, and this description refers to them.

The first and second detection pattern 120 and 140 may be formed of a conductive material, e.g. a metal. Among the metal, Copper (Cu) may be used in consideration of the conductivity and the economic efficiency. However, it is also possible to use gold (Au) instead of copper to form the first and second detection pattern 120 and 140.

The first detection pattern 120 may be extended in a first direction (a horizontal direction in the drawings) and each pattern may be arranged in a line. The second detection pattern 140 may be extended in a second direction perpendicular to the first direction (a vertical direction in the drawings) and each pattern may be arranged in a line. A crossing angle between the first detection pattern 120 and the second detection pattern 140 is not limited to a right angle (90 degree).

The first detection pattern 120 and the second detection pattern 140 may include a shape in which a rhombic pattern is sequentially connected. However, the shape of the pattern is not limited to the rhombic shape, and thus, a variety of shapes may be employed as needed. The rhombic patterns adjacent thereto may be connected to each other by a connection unit, and the connection unit may be provided in a bridge type to connect two patterns.

The first base 110 and the second base 130 may include a metal complex. For example, the first base 110 and the second base 130 may be a complex including resin and a metal oxide. The resin may include any one or more of polycarbonate (PC), polyamide (PA), and acrylonitrile-butadiene-styrene copolymer (ABS), and the metal oxide may include any one or more of Mg, Cr, Cu, Ba, Fe, Ti, and Al.

On one surface of the first base 110, the first pattern groove 111 accommodating the first detection pattern 120 may be formed, and on one surface of the second base 130, the second pattern groove 131 accommodating the second detection pattern 140 may be formed. As a result, the first and second detection pattern 120 and 140 may be provided inside of the first and second pattern groove 111 and 131.

The first and second pattern groove 111 and 131 may be formed by irradiating laser beams to the one surface of the first and second base 110 and 130. In this time, the first and second base 110 and 130 may be reduced to a metal by a heat generated during the groove is formed, and a part that is reduced to the metal may form a metal seed in the first and second pattern groove 111 and 131.

The first and second detection pattern 120 and 140 may be formed by being plated on the first and second pattern groove 111 and 131. A process of plating on the metal seed may employ well-known plating techniques and thus a detailed description thereof will be omitted. The first and second detection pattern 120 and 140 may be formed by a deposition process. Alternatively, the first and second detection pattern 120 and 140 may be formed by a combination of the plating process and the deposition process. Hereinafter it is assumed that the first and second detection pattern 120 and 140 is formed by the plating process.

The first and second detection pattern 120 and 140 may include copper (Cu) plating and nickel (Ni) may be plated on the copper plating for anti-oxidation treatment. In addition, when using gold (Au) plating, the conductivity may be improved.

The first and second base 110 and 130 may be provided to be coated on one surface of a base material (not shown) formed of a variety of material. The base material may include resin, glass or leather. A surface of the base material may be stiff and elastic. The base material may be rigid (i.e., it is hardened so not to be deformed) or flexible (i.e., it is possible to be bent). Further, the base material may be formed by the injection molding method. For example, the base material may be injected to have a variety of shapes, and the first and second base 110 and 130 including a metal oxide may be coated on an upper surface or a bottom surface of the base material.

The touch input device 100-1 according to the second embodiment may be provided such that a touch unit 10 is a curved surface. Therefore, the first and second detection pattern 120 and 140 may be provided to be bent according to a curvature of the touch surface.

The curved surface of the touch unit 10 may include a curved surface having a steady curvature and a curved surface in which a curvature is changed. The curved surface of the touch unit 10 may include a curved surface having more than two curvatures and a curved surface in which a curved direction is changed according to the coordinates. Further, the touch unit 10 may be provided in a bent surface. For example, an edge may be sequentially provided as the touch unit 10.

The first base 110 may have a curved surface on one surface thereof. For example, one surface of the first base 110 may have a shape of a part of a spherical surface. The first pattern groove 111 may be formed on the curved surface of the first base 110. In this time, since the first pattern groove 111 is formed by using the laser, the first pattern groove 111 may have a complicated shape regardless of the shape of the first base 110.

The first detection pattern 120 may be plated on the first pattern groove 111. In this time, due to the property of the plating process, the first detection pattern 120 may be plated regardless of the shape of the first pattern groove 111, and the first detection pattern 120 may be easily plated although the first pattern groove 111 is not provided in a straight line or a plane surface.

The second base 130 may have a certain thickness on the first base 110. Therefore, a curved surface corresponding to the curvature of the first base 110 may be formed on one surface of the second base 130. The second pattern groove 131 may be formed on the curved surface of the second base 130. In this time, since the second pattern groove 131 is formed by using the laser, the second pattern groove 131 may have a complicated shape regardless of the shape of the second base 130.

The second detection pattern 140 may be plated on the second pattern groove 131. In this time, due to the property of the plating process, the second detection pattern 140 may be plated regardless of the shape of the second pattern groove 131, and the second detection pattern 140 may be easily plated although the second pattern groove 131 is not provided in a straight line or a plane surface.

A connection unit connected to the wiring unit 30 may be provided on one side of the first and second detection pattern 120 and 140. The connection unit may be electrically connected to the detection pattern to have a width larger than a width of the detection pattern. The connection unit may be electrically connected to the wiring unit 30 by a solder bonding.

Alternatively, the first and second detection pattern 120 and 140 may be integrally formed with the wiring unit 30, although it is different from the drawings. That is, although the first and second detection pattern 120 and 140 shown in the drawings is provided in the touch unit 10, the detection pattern may be extended to the outside of the touch unit 10 and then directly connected to the connection pad 40 connected to the circuit board.

Hereinafter, a manufacturing method of the touch input device 100-1 according to the second embodiment of the present disclosure will be described with reference to FIGS. 8 to 15.

Figure 8:
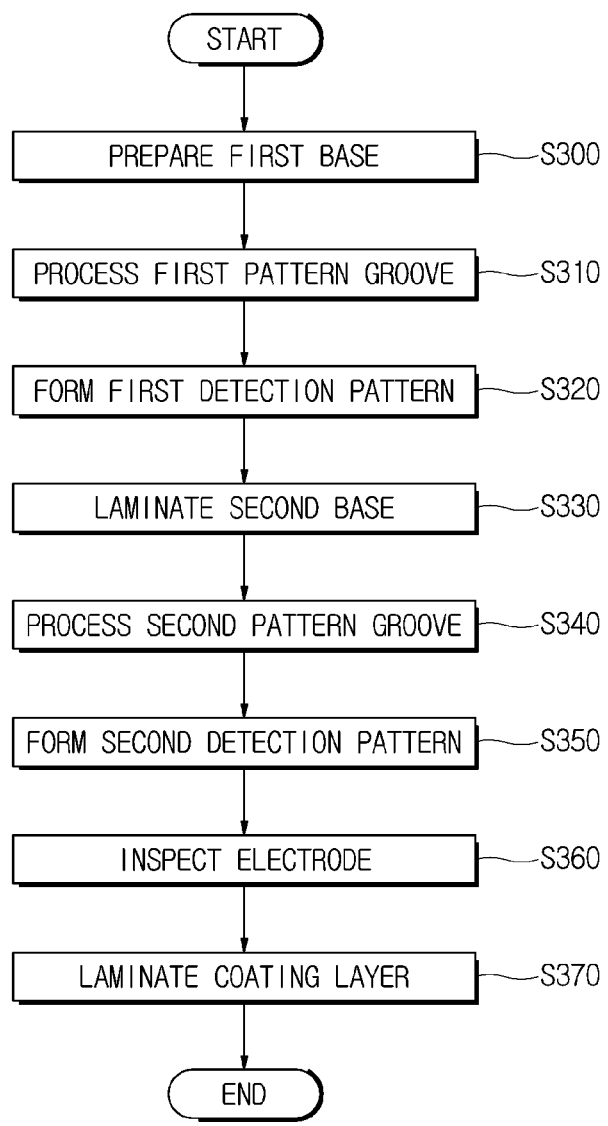
FIG. 8 is a flowchart illustrating a manufacturing method of the touch input device in accordance with the second embodiment of the present disclosure.

FIG. 8 is a flowchart illustrating a manufacturing method of the touch input device 100-1 in accordance with the second embodiment of the present disclosure. FIGS. 9 to 15 are views illustrating a manufacturing method of the touch input device 100-1 in accordance with the second embodiment of the present disclosure.

Figure 9:
FIG. 9 is a view illustrating a process of preparing the first base.

FIG. 9 is a view illustrating a process of preparing the first base 110 (300).

The first base 110 may include a metal complex. For example, the first base 110 may be a complex including resin and a metal oxide. The resin may include any one or more of polycarbonate (PC), polyamide (PA), and acrylonitrile-butadiene-styrene copolymer (ABS), and the metal oxide may include any one or more Mg, Cr, Cu, Ba, Fe, Ti, and Al.

The first base 110 may be formed by the injection molding method. The first base 110 may be formed by injecting a metal complex or by coating one surface of a material, e.g. resin, glass or leather with a metal complex.

A curved surface may be formed on one surface of the first base 110. For example, a curved surface that is recessed to have a shape of a part of a spherical surface may be formed on one surface of the first base 110.

Figure 10:
FIG. 10 is a view illustrating a process of processing the first pattern groove.

FIG. 10 is a view illustrating a process of processing the first pattern groove 111 (310).

The first pattern groove 111 may be formed by irradiating laser beams, e.g. Ultra Violet (UV) laser or excimer laser, to the one surface of the first base 110. In this time, a heat generated during the groove is formed may reduce the metal complex to the metal by breaking the chemical bonding of the metal complex and then form a metal seed on the first pattern groove 111.

The first pattern groove 111 may be formed on one surface of the first base 110 provided in the curved surface. Since the groove is formed by irradiating the laser beams, patterns in a variety of shapes may be formed regardless of the shape of the surface of the first base 110.

Figure 11:
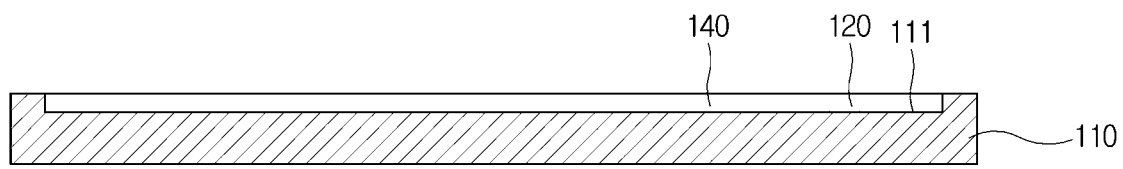
FIG. 11 is a view illustrating a process of forming the first detection pattern.

FIG. 11 is a view illustrating a process of forming the first detection pattern 120 (320).

The first detection pattern 120 may be formed by metalizing the first pattern groove 111 in which a metal sheet is exposed. For example, the first detection pattern 120 may include copper that is plated on the first pattern groove 111. Further, for the oxidation prevention treatment, nickel may be plated on the copper plating.

Figure 12:
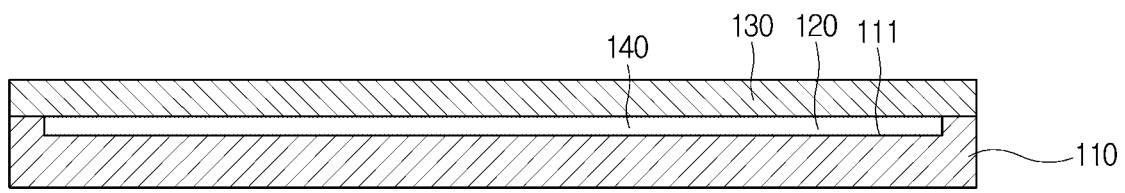
FIG. 12 is a view illustrating a process of laminating the second base.
Figure 13:
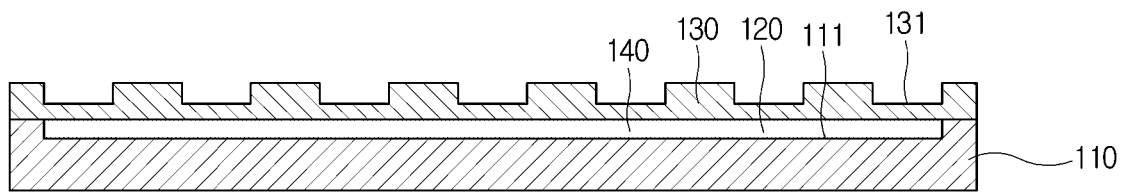
FIG. 13 is a view illustrating a process of processing the second pattern groove.
Figure 14:
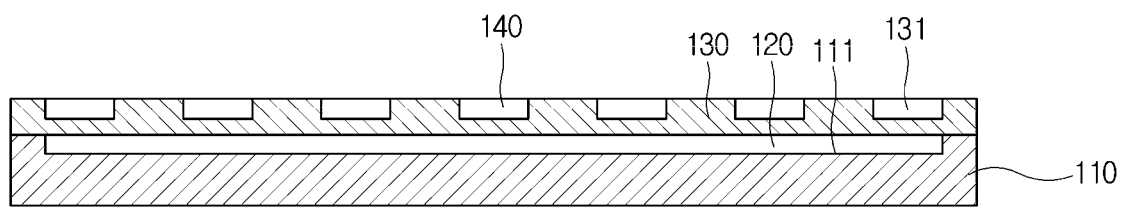
FIG. 14 is a view illustrating a process of forming the second detection pattern.

FIG. 12 is a view illustrating a process of laminating the second base 130 (330), FIG. 13 is a view illustrating a process of processing the second pattern groove 131 (340), and FIG. 14 is a view illustrating a process of forming the second detection pattern 140 (350).

The second base 130 may include a metal complex, and formed to be coated on the first base 110. The description of FIGS. 9 to 11 may be applied to processes shown in FIGS. 12 to 14, and thus, a detailed description thereof will be omitted.

Figure 15:
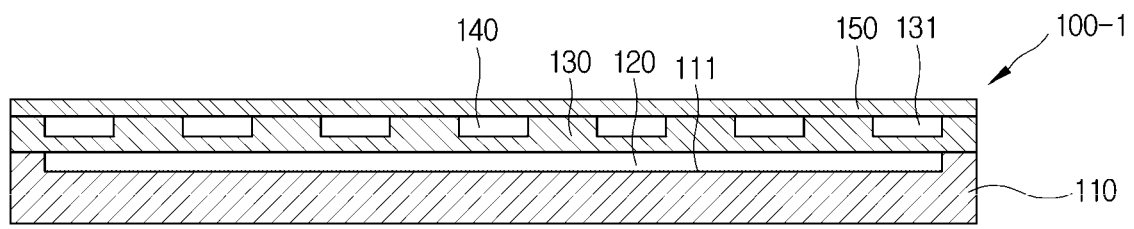
FIG. 15 is a view illustrating a process of laminating the coating layer.

FIG. 15 is a view illustrating a process of laminating the coating layer 150 (370).

The coating layer 150 may be coated on the second base 130 to protect the second pattern 140 from an external impact or contaminants. The coating layer 150 may form the touch surface of the touch unit 10.

Although not shown in the drawings, an inspection process (360) may be further included, wherein the inspection process is to inspect whether the touch input device 100-1 manufactured according to the process shown in FIGS. 9 to 14 is normally operated or not.

The inspection process (360) may include a process in which a current is applied to the first and second detection pattern 120 and 140 to detect a change in mutual capacitance between the first and second detection pattern 120 and 140 so as to determine whether the detection pattern can be used as a sensor. In order that the touch input device 100-1 functions as the product, when the input means comes in contact with the touch unit 10, the mutual capacitance between the first and second detection pattern 120 and 140 may be changed so that a position touched by the input means is detected by detecting the change in the mutual capacitance.

The inspection process (360) may be performed prior to laminating the coating layer 150 (370). This is because it may occur that the second detection pattern 140 is required to be repaired when the second detection pattern 140 does not pass the suitability requirement during the inspection process.

Figure 16:
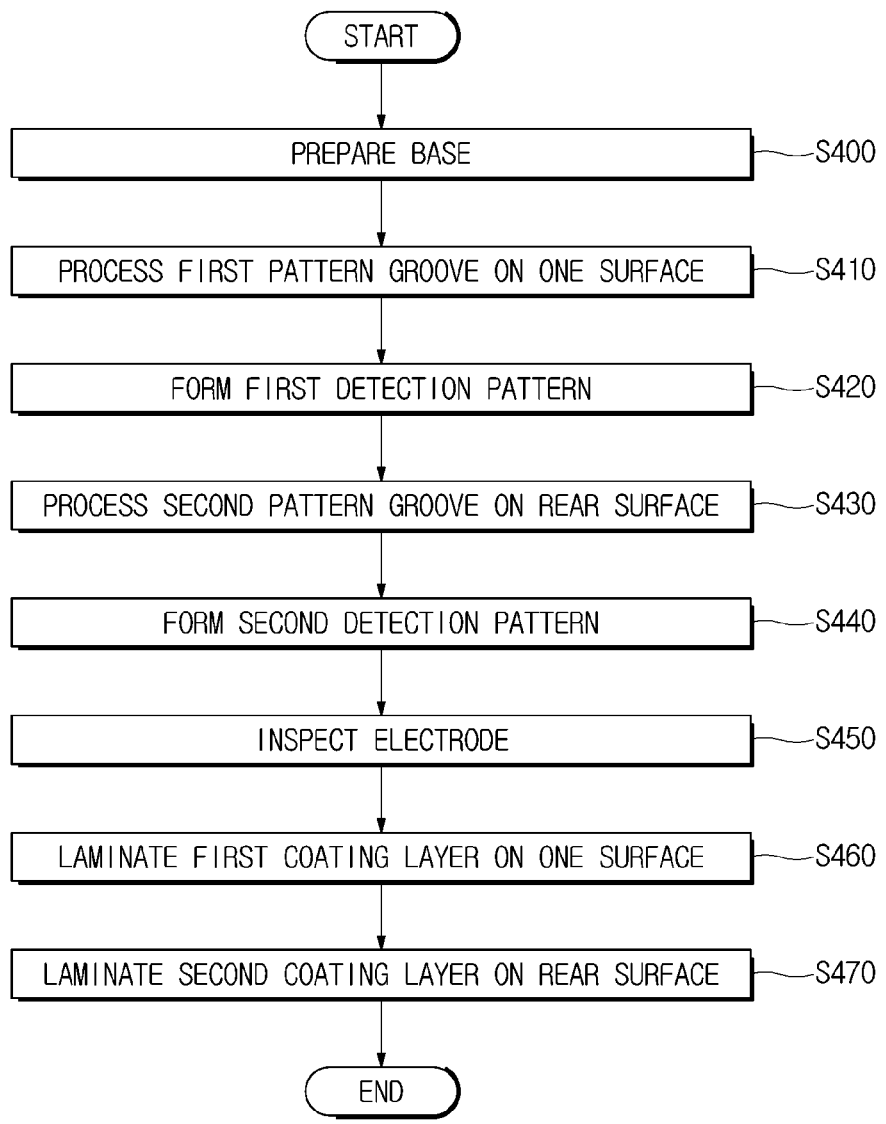
FIG. 16 is a flowchart illustrating a manufacturing method of a touch input device in accordance with a third embodiment of the present disclosure.

FIG. 16 is a flowchart illustrating a manufacturing method of a touch input device 100-2 in accordance with a third embodiment of the present disclosure.

According to the third embodiment, the manufacturing method of the touch input device 100-2 may include preparing a base 110-1 (400), processing a first pattern groove 111 on one surface of the base 110-1 (410), plating a first detection pattern 120 on the first pattern groove 111 (420), processing a second pattern groove 112 on a rear surface of the base 110-1 after inverting the base 110-1 (430), plating a second detection pattern 140 on the second pattern groove 112 (440), protecting the first detection pattern 120 by laminating a first coating layer 150-1 on one surface of the base 110-1 (460), and protecting the second detection pattern 140 by laminating a second coating layer 150-2 on another surface of the base 110-1 (470).

The processing the first pattern groove 111 on one surface of the base 110-1 (410) and the processing the second pattern groove 112 on the rear surface (430) may be simultaneously or sequentially performed. In addition, the plating the first detection pattern 120 (420) and the plating the second detection pattern 140 (440) may be simultaneously or sequentially performed.

An inspection process (450) configured to inspect whether the first detection pattern 120 and the second detection pattern 140 are normally operated or not may be performed prior to the laminating the first and second coating layer (460 and 470)

Figure 17:
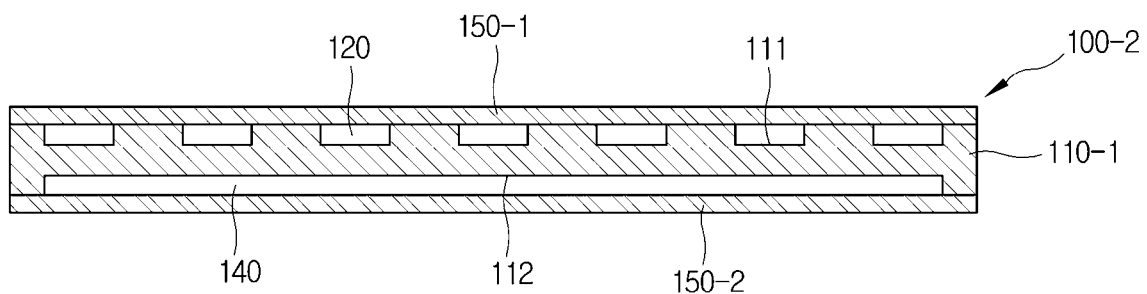
FIG. 17 is a cross-sectional view illustrating the touch input device in accordance with the third embodiment of the present disclosure.

FIG. 17 is a cross-sectional view illustrating the touch input device 100-2 in accordance with the third embodiment of the present disclosure.

Referring to FIG. 17, according to the third embodiment, the touch input device 100-2 may include the base 110-1, the first pattern groove 111 formed on one surface of the base 110-1, the second pattern groove 112 formed on the rear surface of the base 110-1, the first detection pattern 120 plated on the first pattern groove 111, the second detection pattern 140 plated on the second pattern groove 112, the first coating layer 150-1 coated on one surface of the base 110-1 and the second coating layer 150-2 coated on the other surface of the base 110-1.

According to the third embodiment, the touch input device 100-2 may form the first detection pattern 120 and the second detection pattern 140 on opposite surfaces of the base. Accordingly, since a single base 110-1 is used to form the detection pattern having two layers, a thickness of the touch input device 100-2 may be reduced and it may be possible to manufacture a slim product.

Figure 18:
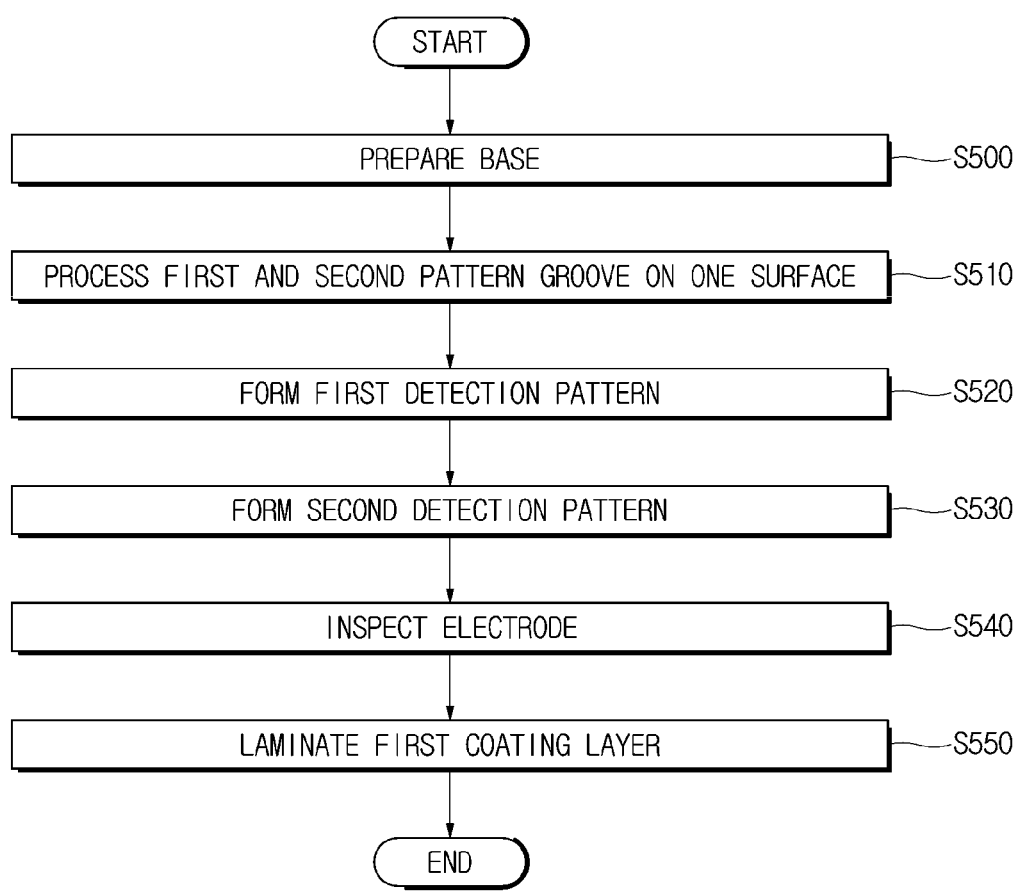
FIG. 18 is a flowchart illustrating a manufacturing method of a touch input device in accordance with a fourth embodiment of the present disclosure.

FIG. 18 is a flowchart illustrating a manufacturing method of a touch input device 100-3 in accordance with a fourth embodiment of the present disclosure.

According to the fourth embodiment, the manufacturing method of the touch input device 100-3 may include preparing a base 110-2 (500), processing a first pattern groove 111 and second pattern groove 112 on one surface of the base 110-2 (510), plating a first detection pattern 120 on the first pattern groove 111 (520), plating a second detection pattern 140 on the second pattern groove 112 (530), and protecting the first and second detection pattern 120 and 140 by laminating a coating layer 150 on one surface of the base 110-2 (550).

An inspection process (540) configured to inspect whether the first detection pattern 120 and the second detection pattern 140 are normally operated or not may be performed prior to the laminating the first and second coating layer (550)

Figure 19:
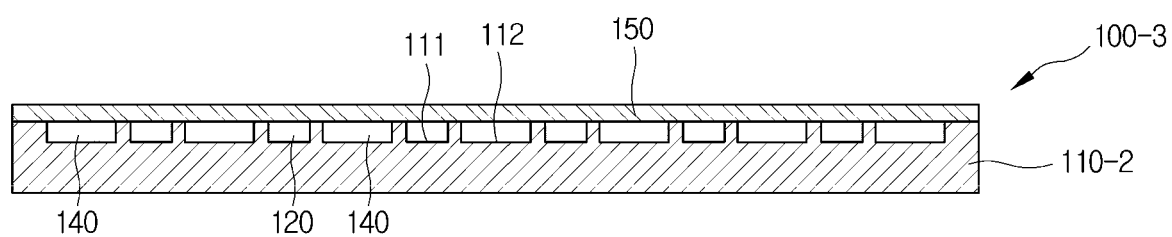
FIG. 19 is a cross-sectional view illustrating the touch input device in accordance with the fourth embodiment of the present disclosure.

FIG. 19 is a cross-sectional view illustrating the touch input device 100-3 in accordance with the fourth embodiment of the present disclosure.

Referring to FIG. 19, according to the fourth embodiment, the touch input device 100-3 may include the base 110-2, the first pattern groove 111 and the second pattern groove 112 formed on one surface of the base 110-2, the first detection pattern 120 plated on the first pattern groove 111, the second detection pattern 140 plated on the second pattern groove 112, and the coating layer 150 coated on one surface of the base 110-2.

According to the fourth embodiment, the touch input device 100-3 may form both of the first detection pattern 120 and the second detection pattern 140 on one surface of the base 110-2. Accordingly, since a single base 110-2 is used to form the detection pattern having two layers, a thickness of the touch input device 100-3 may be reduced and it may be possible to manufacture a slim product.

The first detection pattern 120 and the second detection pattern 140 may be apart from each other by a certain distance without being connected to each other. The first detection pattern 120 and the second detection pattern 140 may have a shape to allow the first detection pattern 120 and the second detection pattern 140 not to be intersected. The shape of the pattern may vary. For example, a case in which a plurality of patterns are formed on one surface is disclosed in US Patent Publication No 2015-0234492.

As is apparent from the above description, according to the proposed touch input device, it may be possible to improve the convenience of user's touch operation by installing the touch sensor on the porous surface through which a medium passes.

In addition, it may be possible to provide a touch sensor function to devices having a difficulty in utilizing a touch sensor, and thus it may be possible to enhance the design freedom of the product and to develop a new User Interface (UI).

When manufacturing the product by using laser directing structure (LDS) method, it may be possible to simplify the manufacturing process and to reduce the cost of the process.

Although the touch unit is provided in a curved surface, it may be easy to form the detection pattern. Particularly, although the touch unit is provided in a double curved surface, it may be possible to form the detection pattern.

Since an adhesion process is not used when forming the detection pattern on the base, it may be protected from the vibration and the impact and thus the durability may be improved.

Since the product is manufactured at high temperature in which the laser is used, the reliability of the product may be enhanced although the product is used at high temperature.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A manufacturing method of a touch input device comprising steps of:
   preparing a base including a metal complex on a body in which a plurality of hole portions are formed;
   forming a pattern groove to pass between the hole portions adjacent thereto by irradiating laser beams to one surface of the base;
   forming a detection pattern by a plating process or a deposition process on the pattern groove; and
   determining whether the detection pattern can be used as a sensor or not by detecting a change in capacitance by providing a current to the detection pattern.

2. The manufacturing method of claim 1,
   wherein the step of preparing the base comprises preparing a first base and a second base laminated on the first base, wherein the step of forming the pattern comprises: forming a first pattern groove by irradiating laser beams to one surface of the first base; and forming a second pattern groove by irradiating laser beams to one surface of the second base, and wherein the step of forming the detection pattern comprises: plating or depositing the first pattern groove with a first detection pattern; and plating or depositing the second pattern groove with a second detection pattern.

3. The manufacturing method of claim 1, wherein the step of forming the pattern groove comprises: forming a first pattern groove by irradiating laser beams to one surface of the base; and forming a second pattern groove by irradiating laser beams to a rear surface of the base, and wherein the step of forming the detection pattern comprises: plating or depositing the first pattern groove with a first detection pattern; and plating or depositing the second pattern groove with a second detection pattern.

4. The manufacturing method of claim 1, wherein the step of forming the pattern groove comprises forming a first pattern groove and a second pattern groove by irradiating laser beams to one surface of the base, and wherein the step of forming the detection pattern comprises: plating or depositing the first pattern groove with a first detection pattern; and plating or depositing the second pattern groove with a second detection pattern apart from the first detection pattern.

5. The manufacturing method of claim 1, further comprising:

modeling a shape of the body including the plurality of hole portions;

modeling the detection pattern such that the detection pattern passes between the hole portions adjacent thereto; and detailed designing the detection pattern in consideration with a width and a thickness of the detection pattern and the number of lines of the detection pattern.

6. The manufacturing method of claim 5, wherein a three dimensional (3D) modeling of the body is performed, wherein the body comprises a curved surface, including a concave surface or a convex surface, in which the plurality of hole portions are formed, and wherein a 3D modeling of the detection pattern is performed such that the detection pattern passes between the hole portions adjacent thereto.

7. The manufacturing method of claim 1, wherein a 3D modeling of a mesh region of the body including the plurality of hole portions is performed and the 3D modeling of the detection pattern is performed according to a shape of the mesh region, and wherein the modeling the detection pattern comprises: modeling a thickness of the detection pattern according to a distance between the plurality of hole portions; and modeling the number of lines of the detection pattern according to an area of the mesh region and a required touch resolution.

* * * * *